:::
United States Patent Office 3,291,803
Patented Dec. 13, 1966

3,291,803
MAGNESIUM SALTS OF PYRIDINE
CARBOXYLIC ACIDS
Bernard F. Duesel, Yonkers, N.Y., assignor to
Nepera Chemical Co., Inc.
No Drawing. Continuation of application Ser. No. 281,036, May 16, 1963. This application Jan. 15, 1965, Ser. No. 425,965
5 Claims. (Cl. 260—295.5)

The invention of the present application for United States Letters Patent is a continuation application based on copending application, Serial No. 281,036, filed May 16, 1963, now abandoned.

This invention relates to a novel method for the preparation of magnesium salts of pyridine carboxylic acids. More particularly, the present invention relates to a method for the preparation of crystalline hydrated magnesium salts of pyridine carboxylic acids of predetermined composition and substantially free of contaminating iron compounds.

Magnesium salts of nicotinic acid, or 3-pyridine carboxylic acid, having significant pharmacological activity are known compositions of matter which have proven to be of value in therapeutics. A pharmaceutical composition consisting of the magnesium salt of nicotinic acid in combination with magnesium dehydrocholate is disclosed in Heymans U.S. Patent No. 2,883,326 with recommendations for its use in treating peripheral vascular disorders. However, although the magnesium salts of nicotinic acid are generally known, the art fails to provide any commercially feasible methods for their preparation in substantially pure form. This is also true of the trihydrate magnesium salts of nicotinic acid and of isonicotinic acid, as well.

Magnesium salts of nicotine acid and isonicotine acid are very soluble in water and prior art processes for their preparation which involve the neutralization and evaporation of aqueous solutions of these salts ultimately lead to the formation of a residue of tacky material of indefinite and nonreproducible composition. Furthermore, the products obtained by this procedure have little commercial appeal as they are usually undesirably colored by contaminating iron compounds which are difficult to remove. These and other disadvantages make the processes hitherto employed impractical and these difficulties have now been overcome by the improved process of the present invention.

It is an important object of this invention to provide a commercially feasible method for preparing magnesium salts of the several pyridine carboxylic acids in good yields. It is also an object of this invention to provide a method for preparing the trihydrate magnesium salts of pyridine carboxylic acids wherein the salts obtained are both of definite and reproducible composition and are, in addition, substantially free of contaminating iron compounds. It is also a specific object of this invention to prepare trihydrate magnesium salts of pyridine monocarboxylic acids.

Other objects of this invention will become apparent from the following detailed description.

The present invention in accordance with the process hereinafter described provides a new and improved method for the preparation of the trihydrate magnesium salts of pyridine carboxylic acids. These salts are formed in accordance with the following reaction:

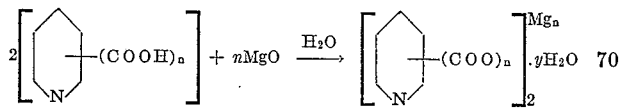

wherein $y$ may vary from 2 to 12 and $n$ is 1 or 2. The salt obtained depends upon the particular pyridine carboxylic acid or mixture of acids employed in the process.

In accordance with the improved method of this invention a reactive magnesium compound is reacted in dilute aqueous solution with a pyridine carboxylic acid; the aqueous reaction medium is then diluted with a lower aliphatic alcohol and, after any insoluble iron compounds present are filtered off, the magnesium salt of the pyridine carboxylic acid in solution in the filtrate is then separated from the aqueous reaction medium. Finally, the magnesium salt of the pyridine carboxylic acid thus separated is then slowly dried.

According to this invention the reactive magnesium compound is preferably added to a sufficient volume of water to form a suspension which will dissolve a stoichiometric quantity of the pyridine carboxylic acid when hot. To dissolve the pyridine carboxylic acid this suspension thus obtained may be heated to about 40° to 60° C. and while being vigorously stirred, the pyridine carboxylic acid is added portion-wise.

It is also possible to reverse the above procedure and suspend the pyridine carboxylic acid in water to which may be added reactive magnesium compound in solid form.

The temperature of the dilute aqueous reaction medium may be further raised after the pyridine carboxylic acid has been added in order to dissolve all of the soluble materials present. An additional amount of reactive magnesium compound may then be added to adjust the pH of the solution slightly to the basic side. Preferably, the reaction solution is maintained at a pH from about 7 to about 10 and preferably at a pH from about 7 to about 8 during the process described above. Careful control of the pH is desirable and increases the reaction rate, the yield and the purity of product.

After the magnesium compound has reacted with the pyridine carboxylic acid the aqueous reaction medium containing the salt thus formed is heated to about 50° C. prior to filtration and preferably to about 70° C. to maintain the soluble pyridine carboxylic acid salts formed in solution. The insoluble residue which separates during the filtration step consists substantially of contaminating iron compounds which appear to be certain iron salts of pyridine carboxylic acid and certain iron carbonates.

After the aqueous reaction medium is filtered and the insoluble iron compounds removed the solution may be spray dried by any known procedure to separate the salt from the solvent or alcohol in an amount from about 25% to about 175% by volume of the aqueous reaction medium which may be added to the filtrate followed by cooling and crystallization. Any suitable and miscible lower aliphatic alcohol such as methanol, ethanol or propanol may be added to the aqueous reaction medium although isopropanol is preferred. When the alcohol addition is complete the mixture may be allowed to cool to a temperature of about 0°–25° C. and held at that temperature for a period of time sufficient to permit the reaction product to crystallize from solution.

Crystallization of the reaction product may be effected by seeding the diluted aqueous alcoholic reaction medium since supersaturation usually results. When the rate of crystallization is observed to decline substantially, the liquid portion is carefully separated, either by filtration or by merely decanting the supernatant liquid. The precipitated crystals are recovered and then washed with an alcohol such as isopropanol or the like to facilitate drying. The white crystalline magnesium salts of the pyridine carboxylic acids thus recovered contain about 9 mols of water per mol of salt.

The white crystalline magnesium salts of the pyridine carboxylic acids thus recovered are removed from the filter press and dried at about 60° C. to about 80° C. and then at about 90° C. to about 100° C. until the crystalline trihydrate remains. The crystals are dried in this fashion to prevent melting in the removed water of crystallization after the supernatant liquid has been separated. The filtrate from which the crystals have been removed may be further processed to recover an additional crop of the crystalline magnesium salts of pyridine carboxylic acids. This may be accomplished by concentrating the filtrate to the point of crystallization or to about 25% of the original volume by evaporation, cooling the concentrated filtrate, adding additional alcohol and reprocessing the solution as previously described to recover any additional product dissolved in the original filtrate. The recovered salts may again be dried as previously described.

The pyridine carboxylic acids preferably employed in the present invention include nicotinic acid or β-pyridine carboxylic acid; and isonicotinic acid or gamma-pyridine carboxylic acid. The magnesium salts of picolinic acid and dicarboxylic acids such as quinolinic, lutidinic, isocinchomeronic, cinchomeronic and dinicotinic acid may be prepared by slight modifications of the general process of the invention based on the solubility of the acids in question.

The reactive magnesium compounds usefully employed preferably include magnesium oxide and magnesium hydroxide although other magnesium compounds such as magnesium halides and the like may also be used by slight modifications in the practice of the present invention.

The following examples are included in order further to illustrate the invention.

*Example 1*

A suspension of 9.1 kg. of magnesium oxide, U.S.P., in 70 gallons of demineralized water is heated to 50° C. In the course of one-half hour under vigorous stirring 55 kg. of nicotinic acid are added portion-wise. The temperature is raised to 56° C. and stirred until practically all the materials dissolve in the solution. An additional 418 gms. of magnesium oxide, U.S.P., are then added to bring the pH to 7.6. A trace of about 25 gms. of brown insolubles which appeared to be iron nicotinate and iron carbonate appears in the solution and is filtered off after heating the solution to 70° C. The product salts remain in solution during this filtration step with the temperature being maintained about 50° C. 55 gallons of isopropanol are added to the clear straw-colored filtrate and the mixture cooled to and held at 5°–10° C. overnight. The filtrate solution is seeded to start crystallization as the solution is nearly supersaturated thus avoiding a long standing period to precipitate completely. The white crystalline precipitate recovered by filtration contains about 9 mols of water per mol of crystalline salt. The crystals are washed on the filter with isopropanol to facilitate drying. The crystals are then dried at 60°–70° C. to prevent melting in the water of crystallization after which the product salts are further dried at 90°–95° C. to obtain the crystalline trihydrate. The first crop yield is about 50.6 kg. or about 85% theoretical. A second crop is obtained by concentrating the filtrate down to 25% volume, adding an equal volume of isopropanol and recovering additional crystals in a fashion similar to the procedure for separating the first crop. The total recovery of satisfactory material from the two crops was about 90% of the theoretical yield. The recovered crystals when analyzed are found to contain water of crystallization corresponding to the trihydrate magnesium salt of nicotinic acid. A typical assay is as follows:

| Constituent | Found | Theory |
|---|---|---|
| Magnesium | 7.34 | 7.48 |
| Niacin | 72.7 | 75.9 |
| Water | 18.4 | 16.65 |

*Example 2*

The procedure of Example 1 is again repeated using 60 kg. of isonicotinic acid in place of the nicotinic acid and ½ the volume of water employed therein. The pH of the reaction medium is adjusted to 7.4 and then heated to 70° C. whereupon 22 gms. of insoluble brown iron materials precipitate and are filtered from the solution with the assistance of a filter aid. Thereafter, the filtrate is allowed to stand at 5° C. overnight to permit the seeded filtrate to precipitate the magnesium salt in the form of white crystals. The crystalline precipitate is recovered by filtration and when analyzed is found to have about 9 mols of water per mol of salt. The salt is then washed with isopropanol to facilitate drying. The crystalline product is then dried initially at a temperature of 65° C. to prevent melting in the water of crystallization which is removed and then finally dried at 97° C. The yield obtained is 52.5 kg. or about 67% of the theoretical yield. A second crop of crystals is recovered by concentrating the filtrate by evaporation to 30% of the original volume, adding an equal volume of isopropanol, cooling to 0° C. and seeding the condensed volume to facilitate crystallization. The recovered crystals are analyzed and correspond to the trihydrate magnesium salt of isonicotinic acid. Based on the isonicotinic acid the recovered crystals are found to assay to substantially the same specifications as noted in Example 1. The total recovery of satisfactory material is about 83% theoretical.

*Example 3*

The procedure of Example 1 is repeated using dinicotinic acid. A yield of about 45 kg. or about 80% of theoretical is realized. The recovered crystals are analyzed and found to contain water of crystallization corresponding to the trihydrate magnesium salt of dinicotinic acid.

Although the procedure of the invention is illustrated for the preparation of crystalline hydrated magnesium salts of pyridine carboxylic acids, slight modifications therein may readily produce the nonhydrated magnesium salts of the respective pyridine carboxylic acids set forth in the above disclosure.

It is understood that the foregoing detailed description is given merely by way of illustration and that many variations may be made therein without departing from the spirit of the invention.

What is claimed is:

1. A method of preparing a magnesium salt of nicotinic acid which comprises reacting magnesium oxide with nicotinic acid in an aqueous reaction medium, adjusting the pH to greater than 7 and less than 10, diluting the reaction medium by the addition of a lower aliphatic alcohol, filtering contaminating iron compounds from the diluted reaction solution, separating the magnesium salt of nicotinic acid from the reaction medium and drying the separated magnesium salt of nicotinic acid to nearly constant weight.

2. A method of preparing magnesium salts of pyridine carboxylic acids which comprises reacting magnesium oxide or magnesium hydroxide with a pyridine carboxylic acid in an aqueous reaction medium, adjusting the pH to greater than 7 and less than 10, diluting the reaction solution by the addition of a lower aliphatic alcohol, filtering contaminating iron compounds from the diluted reaction medium, separating the magnesium salts of pyridine carboxylic acids from the reaction medium and drying the separated magnesium salts.

3. A method according to claim 2 wherein the pH is adjusted to from about 7 to about 8.

4. A method of preparing a magnesium salt of nicotinic acid which comprises reacting magnesium oxide or magnesium hydroxide with nicotinic acid in an aqueous reaction medium, adjusting the pH to greater than about 7 and less than about 10, filtering off contaminating iron compounds from the reaction medium, diluting the reaction medium with a lower aliphatic alcohol, separating the magnesium salt of nicotinic acid from the reaction medium, and drying the separated magnesium salt of nicotinic acid to nearly constant weight.

5. A method according to claim 4 wherein the pH is adjusted to from about 7 to about 8.

References Cited by the Examiner
UNITED STATES PATENTS

| | | | |
|---|---|---|---|
| 2,748,136 | 5/1956 | Hultquist | 260—295 |
| 2,883,326 | 4/1959 | Heymans | 167—68 |

WALTER A. MODANCE, *Primary Examiner.*

ALAN L. ROTMAN, *Assistant Examiner.*